United States Patent
Qi et al.

(10) Patent No.: US 9,777,654 B2
(45) Date of Patent: Oct. 3, 2017

(54) METHOD AND APPARATUS FOR IMPROVED LIGHTOFF PERFORMANCE OF AFTERTREATMENT CATALYSTS

(71) Applicant: GM GLOBAL TECHNOLOGY OPERATIONS LLC, Detroit, MI (US)

(72) Inventors: Gongshin Qi, Troy, MI (US); Eric D. Thomas, Shelby Township, MI (US); Charles E. Solbrig, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/994,338

(22) Filed: Jan. 13, 2016

(65) Prior Publication Data
US 2017/0198653 A1    Jul. 13, 2017

(51) Int. Cl.
| F02D 41/02 | (2006.01) |
| F02D 41/04 | (2006.01) |
| F01N 3/08 | (2006.01) |
| F01N 3/10 | (2006.01) |
| F01N 11/00 | (2006.01) |

(52) U.S. Cl.
CPC ....... *F02D 41/0285* (2013.01); *F01N 3/0842* (2013.01); *F01N 3/0885* (2013.01); *F01N 3/103* (2013.01); *F01N 11/002* (2013.01); *F02D 41/042* (2013.01); *F01N 2550/02* (2013.01); *F01N 2550/03* (2013.01)

(58) Field of Classification Search
CPC ...... F01N 3/0842; F01N 3/103; F01N 11/002; F01N 2550/02; F01N 255/03; F02D 41/042
See application file for complete search history.

(56) References Cited

U.S. PATENT DOCUMENTS

| 5,974,794 A * | 11/1999 | Gotoh | B01D 53/9422 60/284 |
| 6,220,019 B1 * | 4/2001 | Sugiura | B01D 53/9431 60/284 |
| 8,959,894 B2 | 2/2015 | Qi | |
| 2004/0226287 A1 * | 11/2004 | Edgar | F01N 3/023 60/295 |
| 2006/0260297 A1 * | 11/2006 | Koch | F01N 3/0807 60/286 |
| 2008/0314020 A1 * | 12/2008 | Hoard | F01N 3/0871 60/274 |
| 2013/0019589 A1 | 1/2013 | Kim | |
| 2013/0111886 A1 * | 5/2013 | Gonze | F01N 9/00 60/286 |

(Continued)

*Primary Examiner* — Patrick Maines (57) ABSTRACT

A method for controlling a vehicle including an exhaust aftertreatment system for purifying exhaust gases from a compression-ignition engine includes monitoring vehicle operating parameters, determining whether the vehicle is stopped, determining whether the engine is commanded off, and determining whether the exhaust aftertreatment device is at a predetermined operating temperature. When the vehicle is stopped, the engine is commanded off and the exhaust aftertreatment device is at the predetermined operating temperature the engine is controlled in a run-on state for a predetermined period of time. The run-on state includes operating the engine in a throttled and fueled state.

20 Claims, 5 Drawing Sheets

(56) References Cited

U.S. PATENT DOCUMENTS

2014/0026851 A1* 1/2014 Harmsen ............... F02D 41/30
              123/344
2014/0165535 A1* 6/2014 Gonze ................. F01N 3/0842
              60/273

* cited by examiner

METHOD AND APPARATUS FOR IMPROVED LIGHTOFF PERFORMANCE OF AFTERTREATMENT CATALYSTS

TECHNICAL FIELD

This disclosure is related to exhaust purification systems for compression-ignition internal combustion engines.

BACKGROUND

The statements in this section merely provide background information related to the present disclosure. Accordingly, such statements are not intended to constitute an admission of prior art.

Compression-ignition internal combustion engines operate at lean air/fuel ratios to achieve desirable fuel efficiencies. Lean engine operation may produce oxides of nitrogen ($NO_x$) when nitrogen and oxygen molecules present in engine intake air disassociate in the high temperatures of combustion. Rates of $NO_x$ production follow known relationships in the combustion process, for example, with higher rates of $NO_x$ production being associated with higher combustion temperatures and longer exposure of air molecules to the higher temperatures. $NO_x$ molecules may be reduced to nitrogen and water in aftertreatment devices. Efficacy of known aftertreatment devices is dependent upon operating conditions including operating temperature, which is associated with exhaust gas flow temperatures and engine air/fuel ratio. Aftertreatment devices include materials prone to damage or degradation when exposed to elevated temperatures and/or contaminants in the exhaust gas feedstream.

Aftertreatment systems purify exhaust gases by filtering, oxidizing and/or reducing constituents in an exhaust gas feedstream. Three-way catalytic devices (TWC) oxidize and reduce exhaust gas constituents. $NO_x$ adsorbers store $NO_x$, which may be subsequently desorbed and reduced under specific engine operating conditions. Diesel particulate filters (DPF) are able to remove particulate matter in the exhaust gas feedstream through mechanical filtering.

The exhaust gas treatment system of a lean-burn engine typically contains a diesel oxidation catalyst (DOC). When the exhaust gas stream is passed through the DOC it contacts a catalyst material, such as platinum, that is capable of oxidizing CO to $CO_2$, HC to $CO_2$ and water, and NO to $NO_2$. The exhaust gas may then be passed through a selective catalytic reduction (SCR) system located downstream of the oxidation catalyst within the treatment system. An SCR operates by injecting a reductant material, such as ammonia or unburned fuel constituents, into the exhaust gas stream before the exhaust gas is passed over a reduction catalyst material configured to reduce an amount of $NO_2$ to $N_2$ in the exhaust gas in the presence of the reductant additive.

In another approach, an engine that primarily operates in a fuel-lean mode may be controlled to briefly operate in a fuel-rich mode to increase the amount of unburned fuel constituents in the exhaust gas. When the engine is operated in the fuel-rich mode, the fuel constituents in the exhaust gas promote the reduction of $NO_2$ to $N_2$ in the presence of a reduction catalyst. In this treatment method, the exhaust gas is passed in contact with a combination of materials that, when combined in a treatment system, are capable of efficiently reducing $NO_x$ to $N_2$. Such a combination is known as a Lean $NO_x$ Trap (LNT). A conventional LNT includes a $NO_x$ oxidation catalyst, a $NO_x$ reduction catalyst, and a $NO_x$ storage material to temporarily store, or "trap," the $NO_x$. LNTs function under cyclical oxidizing and reducing exhaust gas conditions. The cyclical exhaust gas environment is controlled by operating the associated engine in a fuel-lean mode for a major portion of an engine control cycle and in a fuel-rich mode for a minor portion of the cycle. The engine control cycle is repeated, and the controlled cyclical oxidizing and reducing exhaust gas conditions are produced.

Vehicles with an Internal Combustion Engine (ICE) include an exhaust gas treatment system for treating the exhaust gas from the engine. The treatment system typically includes a close-coupled catalytic converter and an underfloor catalytic converter, each of which includes a catalyst that reduces nitrogen oxides in the exhaust gas to nitrogen and water, as well as oxidizes carbon monoxide (CO) and unburnt hydrocarbons (HCs) to carbon dioxide and water. The catalyst may include, but is not limited to, Platinum Group Metals (PGM). The catalyst is not operational until it is heated to a certain temperature, often referred to as the "light-off" temperature. The exhaust gas may be used to heat the catalyst to the light-off temperature for treatment of the exhaust gas.

Low-temperature emission control technologies may include an exhaust gas heater, such as but not limited to an electric heating module, to further heat the exhaust gas to reduce the time to heat the catalyst to the light-off temperature. Including such a device, however, may add significantly to the complexity and cost of the emission control system.

SUMMARY

A method for controlling a vehicle including an exhaust aftertreatment system for purifying exhaust gases from a compression-ignition engine includes monitoring vehicle operating parameters, determining whether the vehicle is stopped, determining whether the engine is commanded off, and determining whether the exhaust aftertreatment device is at a predetermined operating temperature. When the vehicle is stopped, the engine is commanded off and the exhaust aftertreatment device is at the predetermined operating temperature the engine is controlled in a run-on state for a predetermined period of time. The run-on state includes operating the engine in a throttled and fueled state.

BRIEF DESCRIPTION OF THE DRAWINGS

One or more embodiments will now be described, by way of example, with reference to the accompanying drawings, in which:

FIG. 3-1 illustrates CO oxidation performance of a LNT based aftertreatment device based on exhaust gas inlet temperature, in accordance with the disclosure;

FIG. 3-2 illustrates $C_3H_6$ oxidation performance of a LNT based aftertreatment device based on exhaust gas inlet temperature, in accordance with the disclosure;

FIG. 3-3 illustrates HC oxidation performance of a LNT based aftertreatment device in relation to exhaust gas inlet temperature, in accordance with the disclosure;

FIG. 5-1 illustrates an alternate embodiment of an exhaust aftertreatment system that has been constructed to purify exhaust gases that are output from a compression-ignition internal combustion engine, in accordance with the disclosure;

FIG. 5-2 illustrates an alternate embodiment of an exhaust aftertreatment system that has been constructed to purify exhaust gases that are output from a compression-ignition internal combustion engine, in accordance with the disclosure;

FIG. 5-3 illustrates an alternate embodiment of an exhaust aftertreatment system that has been constructed to purify exhaust gases that are output from a compression-ignition internal combustion engine, in accordance with the disclosure; and FIG. 6 illustrates an exemplary method of controlling the engine to improve exhaust gas aftertreatment device conversion during engine cold start events in an exhaust aftertreatment system including an electrically heated catalyst (EHC), in accordance with the disclosure.

DETAILED DESCRIPTION

Figure 1:
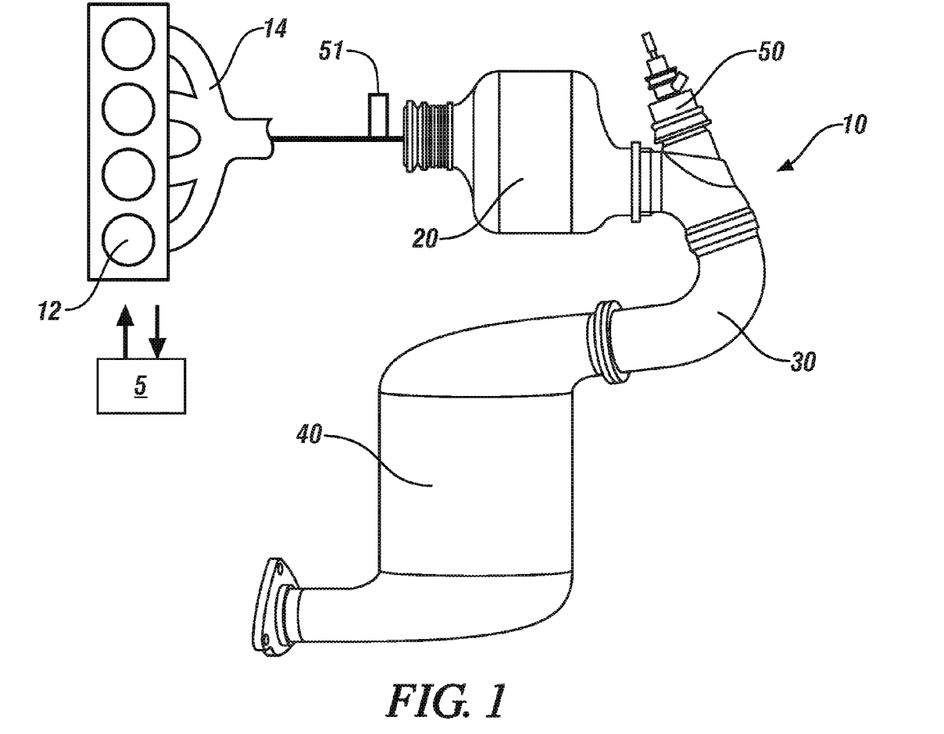
FIG. 1 illustrates an exhaust aftertreatment system for an internal combustion engine including a first exhaust aftertreatment device, a second exhaust aftertreatment device, and a reductant injection system, in accordance with the disclosure.

Referring now to the drawings, wherein the showings are for the purpose of illustrating certain exemplary embodiments only and not for the purpose of limiting the same, FIG. 1 schematically illustrates an exhaust aftertreatment system 10 that has been constructed in accordance with an embodiment of the disclosure to purify exhaust gases that are output from a compression-ignition internal combustion engine 12.

In one embodiment, the internal combustion engine 12 is a multi-cylinder compression-ignition, direct-injection, four-stroke internal combustion engine operative in a repetitive combustion cycle including intake, compression, power and exhaust strokes. The engine 12 operates at an air/fuel ratio that is primarily lean of stoichiometry, and generates exhaust gases including hydrocarbons (HC), carbon monoxide (CO), nitrogen oxides ($NO_x$) and particulate matter (PM). The engine 12 has an exhaust outlet that preferably includes an exhaust manifold 14 that entrains exhaust gases flowing therefrom, with the entrained exhaust gases directed to the exhaust aftertreatment system 10. Operation of the engine 12 and aftertreatment system 10 is monitored and controlled by an engine controller 5. A control system comprises the engine 12, aftertreatment system 10, engine controller and other associated components, sensors, inputs and control routines.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The controller has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

The exhaust aftertreatment system 10 purifies exhaust gases from the compression-ignition internal combustion engine 12, and includes a first exhaust aftertreatment device 20, a second exhaust aftertreatment device 40, and a reductant injection system including urea injector 50. The first exhaust aftertreatment device 20 includes an oxidation catalyst and a particulate filter element, and fluidly couples to an exhaust outlet, e.g., the exhaust manifold 14 of the engine 12. The second exhaust aftertreatment device 40 includes an ammonia-selective catalytic reduction catalyst that fluidly couples to a downstream outlet of the first exhaust aftertreatment device 40 via an exhaust pipe 30. The reductant injection system injects urea reductant into the exhaust gas feedstream between the first exhaust aftertreatment device 20 and the second exhaust aftertreatment device 40.

The exhaust aftertreatment system 10 preferably includes exhaust gas sensors, including a first sensor 51 that monitors the engine-out exhaust gas feedstream including a state of a parameter correlatable to engine-out air/fuel ratio and/or a constituent of engine-out exhaust gas. The exhaust aftertreatment system 10 includes other sensors, including a sensor that monitors the exhaust gas feedstream downstream of the exhaust aftertreatment system 10. The monitoring of the exhaust gas feedstream includes, e.g., monitoring a state of a parameter correlatable to the engine-out air/fuel ratio, monitoring a constituent of the exhaust gas feedstream, or monitoring an operating characteristic of the exhaust aftertreatment system 10 or one of the devices thereof, e.g., temperature. The signal outputs from the first sensor 51 and other sensors are monitored by the controller 5 for purposes related to control and diagnostics of the engine 12 and the exhaust aftertreatment system 10.

The first exhaust aftertreatment device 20 includes an oxidation catalyst in combination with a particulate filter element that fluidly couples to the exhaust manifold 14 of the engine 12 to treat entrained raw exhaust gases output from the engine 12. Treating entrained raw exhaust gases preferably includes oxidizing unburned hydrocarbons (HCs) and mechanically removing particulate matter by filtering. In one embodiment, the particulate filter element includes a ceramic substrate in the form of a monolithic cordierite substrate having a cell density about 31 to 62 cells per square centimeter (200-400 cells per square inch), and a wall thickness of three to seven mils. Alternating cells of the substrate are plugged at one end. The walls of the substrate have high porosity, e.g., about 55% porosity or higher with a mean pore size of about 25 microns to permit flow of exhaust gases to entrap particulate matter in the exhaust gas feedstream. Other suitable substrates may be employed to trap, oxidize, and otherwise manage particulate matter produced during combustion. The walls of the substrate are impregnated with a catalytically active washcoat for oxidizing unburned HCs contained in the exhaust gas feedstream. The washcoat includes suitable catalytically active materials, e.g., platinum-group metals including Pt, Pd, and additives including, e.g., Ce, Zr, La, Ba at densities and ratios sufficient to effect oxidation of the unburned HCs and perform other operations such as oxygen storage for diagnostic evaluations. In one embodiment, a powder having a 50 g/ft$^3$ at a ratio of 2:1 Pt:Pd is prepared using a slurry having chloroplatinic acid ($H_2PtCl_6$. $6H_2O$) and palladium nitrate ($Pd(NO_3)_2$) that is mixed with a solution containing platinum and a solution containing palladium that was stirred, dried, and calcined. A washcoat slurry containing the calcined powder, water and acetic acid is prepared and applied to a cordierite substrate core using a longitudinal slurry flow process. The coated substrate is dried and calcined, and then assembled into a finished device that is assembled onto a vehicle. Design features including total volume, space velocity, cell density, washcoat materials, and loading(s) of catalytic material(s) are application-specific.

In an exemplary alternate embodiment the first exhaust aftertreatment device 20 may be treated with materials found in Lean $NO_x$ Trap (LNT) systems. In another exemplary alternate embodiment, the first exhaust aftertreatment device may include LNT materials added to the washcoat of an oxidation catalyst such that the first exhaust aftertreatment device 20 may allow for accelerated cold start lightoff and reduced emissions during cold start of the engine. Known LNT systems include a collection of particulate materials capable of converting $NO_x$ to $N_2$ in the high-oxygen exhaust gas of a lean-burn engine. The LNT system combines (1) an oxidation catalyst material capable of oxidizing NO to $NO_2$, (2) a storage material capable of temporarily storing, or "trapping," $NO_x$ and removing it from the exhaust gas, and (3) a reduction catalyst material capable of reducing NO and $NO_2$ to $N_2$. The three LNT materials (oxidizing, storing, and reducing) cooperatively convert $NO_x$ to $N_2$ when they are cyclically exposed to an oxidizing exhaust gas environment and a reducing exhaust gas environment. The controlled cyclical exhaust gas environment is created by operating the associated engine in a fuel-lean mode for a major portion of an engine control cycle and in a fuel-rich mode for a minor portion of the engine cycle.

Typically, a compression ignition engine operates by burning a mixture of air and fuel with an air-to-fuel (A/F) mass ratio that is greater than the stoichiometric A/F ratio, otherwise referred to as a "lean" mixture. The stoichiometric A/F ratio of diesel fuel is approximately 14.7, but the A/F ratio burned in a typical compression ignition diesel engine is 17 or greater. A lean mixture of air and fuel contains more oxygen than is necessary for complete fuel combustion, and, when it is burned in an engine, results in an exhaust gas containing higher concentrations of oxygen (e.g. about one to ten percent by volume). Engines that burn lean mixtures of air and fuel are fuel efficient, and the resultant exhaust gas contains low amounts of unburned fuel constituents (e.g., about 250 to 750 ppmv HC) and nominal amounts of CO. That is, a lean-burn engine typically produces an oxidizing exhaust gas environment.

Alternatively, a mixture of air and fuel with an A/F ratio that is equal to or less than the stoichiometric A/F ratio is referred to as a "rich" mixture. A mixture with an A/F ratio equal to the stoichiometric ratio contains just enough oxygen to completely burn the fuel, while a mixture with an A/F ratio less than the stoichiometric ratio contains an abundance of fuel. When either mixture is burned in a combustion engine the effluent exhaust gas contains low concentrations of oxygen (e.g., less than one volume percent), and relatively high amounts of CO and HCs (e.g., about 0.5 to 1.0 volume percent and about 500 to 1,000 ppmv, respectively). As such, rich-burn engines typically produce a reducing exhaust gas environment.

Therefore, the combustion engine disclosed herein is operated by burning a controllable mixture of air and fuel that is either lean or rich with respect to the stoichiometric A/F ratio, which produces an exhaust gas with either an oxidizing or reducing environment. When the engine is operated in a fuel-lean mode, the excess oxygen in the exhaust gas promotes the oxidation of NO to $NO_2$ over the oxidation catalyst material, and the removal of $NO_x$ from the exhaust gas by adsorption onto the storage material. When the engine is operated in a fuel-rich mode, the fuel constituents in the exhaust gas trigger the release of $NO_x$ from the storage material (and the regeneration of $NO_x$ storage sites), and promote the reduction of the released $NO_x$ to $N_2$ over the catalyst material.

During operation the engine is cyclically operated between fuel-lean and fuel-rich modes so that the three LNT materials (oxidizing, reducing, and storing) can cooperatively remove $NO_x$ from the exhaust gas produced by the engine. Additionally, the duration of each cycle and mode is optimized so that the $NO_x$ storage sites on the storage material are frequently regenerated, and the LNT system continuously produces a treated exhaust gas flow with acceptably low levels of $NO_x$.

In the exemplary embodiment, the engine 12 is supplied with a continuous air flow at a variable mass flow rate responsive to engine performance demands (i.e., pressing and depressing a foot pedal located in the driver-side compartment to affect vehicle speed and acceleration). A calculated quantity of pressurized fuel is rapidly and intermittently injected into an incoming air flow just upstream from the engine 12, as dictated, for example, by an engine control strategy, to produce a mixture of air and fuel that exhibits a predetermined air to fuel mass ratio. The quantity of fuel injected into the incoming air flow is controlled to maintain a lean air to fuel mass ratio or a rich air to fuel mass ratio, or to switch between the two states.

The mixture of air and fuel enters an intake manifold of the internal combustion engine 12 and exits as an exhaust gas through the exhaust manifold. The air portion of the lean or rich A/F mixture is supplied by an air induction system (not shown) that includes a throttle body valve. The fuel portion of the lean or rich A/F mixture is supplied by fuel injectors (not shown) that dispense pressurized fuel into the incoming air flow. An electronic fuel injection system (not shown) may continuously manage the mixture of air and fuel delivered to the engine 12 in accordance with an engine control strategy. The electronic fuel injection system may utilize an electronic control module (ECM) that sends corresponding output signals to the fuel injectors located on the engine 12 to dispense the proper amount of fuel into the incoming air flow.

As the exhaust gas stream passes through the LNT based aftertreatment device 20 it contacts the LNT particulate materials (oxidizing, reducing, and storing) that are dispersed on the wall surfaces of the aftertreatment device 20. A high surface area of the walls of the aftertreatment device 20 creates sufficient contact between the exhaust gas and the three LNT materials for the desired $NO_x$ conversion reactions to occur.

The first exhaust aftertreatment device 20 is preferably assembled to the exhaust manifold 14 in an underhood location, and is close-coupled to the engine exhaust so as to maximize heat transfer from the engine exhaust to the first exhaust aftertreatment device 20. The first exhaust aftertreatment device 20 can be close-coupled to the engine exhaust by direct assembly to the exhaust manifold 14 without any intervening exhaust pipe. Alternatively, a flexible coupling unit may be assembled between the exhaust manifold 14 and the first exhaust aftertreatment device 20.

The first exhaust aftertreatment device 20 can be close-coupled to the engine exhaust by being configured as a plurality of exhaust aftertreatment devices 20 arranged in parallel and assembled into runners of the exhaust manifold 14.

The second exhaust aftertreatment device 40 includes an ammonia-selective catalytic reactor device (NH3-SCR device) that fluidly couples to a downstream outlet of the first exhaust aftertreatment device 20. The second exhaust aftertreatment device 40 is preferably assembled downstream of the first exhaust aftertreatment device 20 in an underhood location or an underbody location, depending upon space availability and other factors. The NH3-SCR device 40 includes one or more ceramic coated substrates preferably fabricated from cordierite material and having a multiplicity of flowthrough passageways that are coated with washcoat and catalytic materials to store ammonia for reacting with $NO_x$ molecules present in the exhaust gas feedstream. The NH3-SCR device 40 reduces $NO_x$ into other molecules, including nitrogen and water. The substrate is preferably coated with a zeolite washcoat and catalytic material including a catalytically active base metal. The substrate includes a cordierite or metal monolith with a cell density about 62 to 93 cells per square centimeter (400-600 cells per square inch), and a wall thickness ranging from three to seven mils. The cells of the substrate include flow passages through which exhaust gas flows to contact the catalyst to effect storage of ammonia. The substrate is impregnated with the zeolite washcoat. The zeolite washcoat contains catalytically active base metals, e.g., iron (Fe), copper (Cu), cobalt (Co), and/or nickel (Ni). Alternatively, vanadium-based and/or tungsten (W) on titanium (Ti) compositions may be used as catalysts.

A urea injector 50 may inject urea into the exhaust pipe 30 upstream of the NH3-SCR device 40 via a nozzle inserted therein in response to a command from a controller, e.g., the engine controller 5. The exhaust aftertreatment system 10 is preferably located in an engine compartment of a vehicle, with the oxidation catalyst in combination with the particulate filter element 20 closely coupled to the engine exhaust outlet to effect rapid light-off thereof during an engine cold start and run event.

The configuration of the first exhaust aftertreatment device 20 and the second exhaust aftertreatment device 40 affords flexibility to engine and exhaust system designers by reducing overall physical size, mass and cost of the exhaust aftertreatment system, and also reduces the thermal mass of the system leading to reduced warm-up times and reduced hydrocarbon light-off times during an engine cold start and run event. It also permits flexibility in locating the SCR device, including locating the SCR device in a vehicle underbody position.

Figure 2:
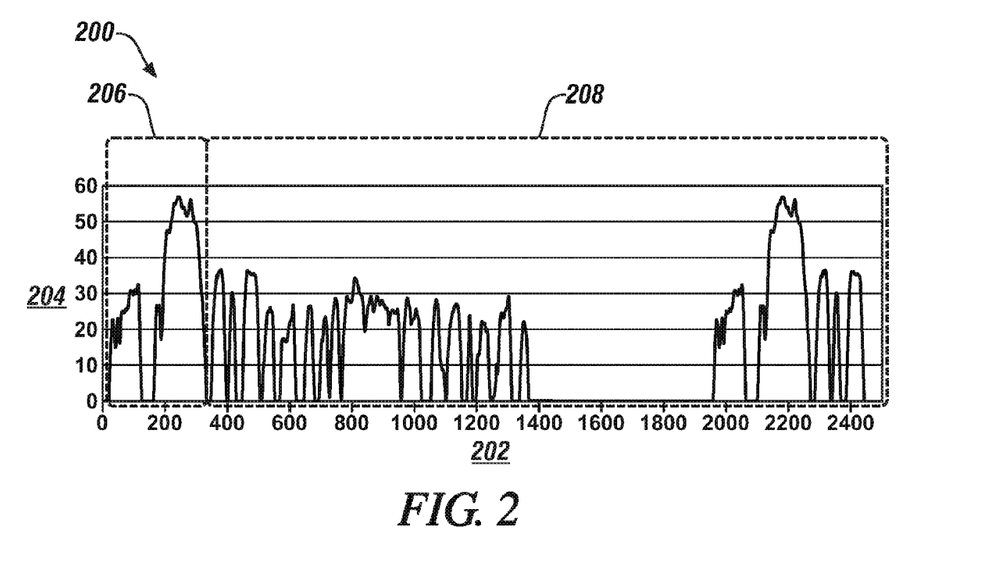
FIG. 2 illustrates an FTP 75 cycle plot and the corresponding $NO_x$ emissions during cold-start and subsequent engine operation, in accordance with the disclosure.

FIG. 2 graphically depicts an FTP 75 cycle plot and the corresponding $NO_x$ emissions during cold-start and subsequent engine operation. More than 50% of total $NO_x$ emitted from the exhaust system is emitted during the first two cycles of engine operation due to cold-start. Plot 200 illustrates an exemplary FTP 75 cycle of a compression ignition engine. Horizontal axis 202 depicts time (seconds) and vertical axis 204 depicts speed (mph). The first two cycles depicted in range 206 emit an average tailpipe $NO_x$ of 80 mg/mile. The remaining cycles depicted in range 208 emit an average tailpipe $NO_x$ of 40 mg/mile. The increased emission of tailpipe $NO_x$ during the first two cycles results from the cold start conditions.

Figure 31:
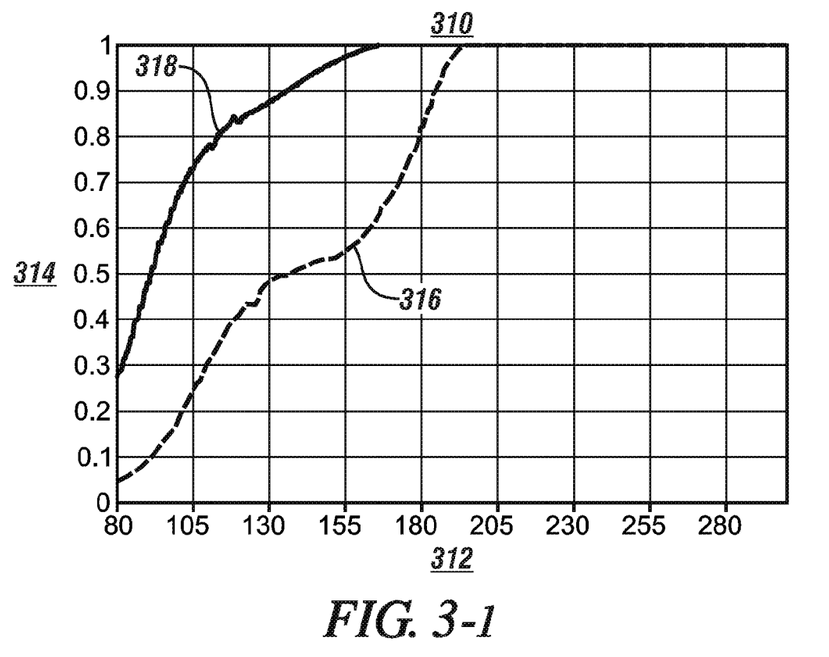

FIG. 3-1 depicts CO oxidation performance of a LNT based aftertreatment device based on exhaust gas inlet temperature. Plot 310 depicts inlet temperature (° C.) on horizontal axis 312 and conversion ratio along vertical axis 314. Plot line 316 depicts the conversion ratio 314 in relation to inlet temperature 312 for a LNT based aftertreatment device having no regeneration cycles in a fuel rich mode. Plot line 318 depicts the conversion ratio 314 in relation to inlet temperature 312 for a LNT based aftertreatment device having been exposed to regeneration cycles in a fuel rich mode. The LNT based aftertreatment device demonstrates improved performance after regenerating under fuel rich conditions. In an exemplary embodiment wherein the aftertreatment device includes an oxidation catalyst not having been treated with LNT materials a similar improvement may occur as the oxidation catalyst is regenerated during the fuel rich mode regeneration cycles.

Figure 32:
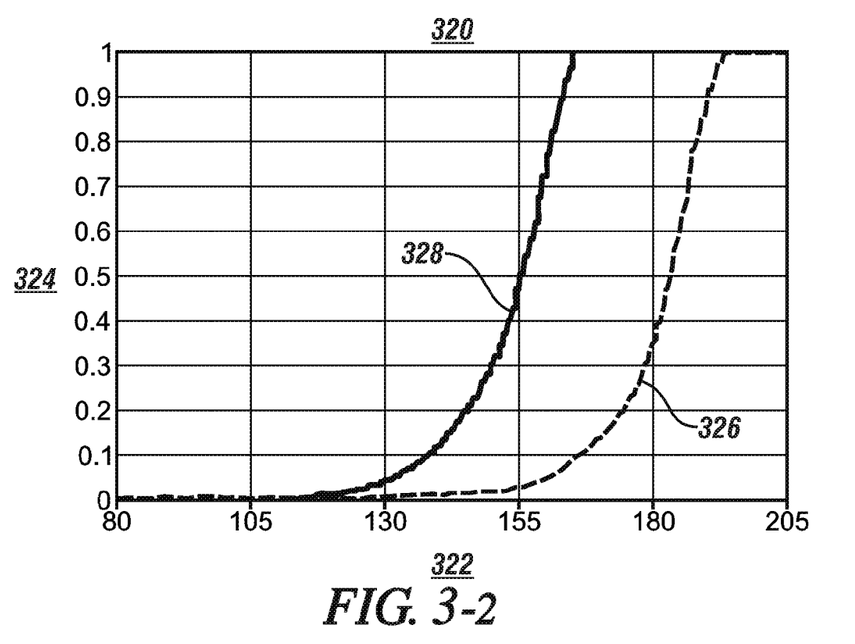

FIG. 3-2 depicts $C_3H_6$ oxidation performance of a LNT based aftertreatment device based on exhaust gas inlet temperature. Plot 320 depicts inlet temperature (° C.) on horizontal axis 322 and conversion ratio along vertical axis 324. Plot line 326 depicts the conversion ratio 324 in relation to inlet temperature 322 for a LNT based aftertreatment device having no regeneration cycles in a fuel rich mode. Plot line 328 depicts the conversion ratio 324 in relation to inlet temperature 322 for a LNT based aftertreatment device having been exposed to regeneration cycles in a fuel rich mode. The LNT based aftertreatment device demonstrates improved performance after regenerating under fuel rich conditions. In an exemplary embodiment wherein the aftertreatment device includes an oxidation catalyst not having been treated with LNT materials a similar improvement may occur as the oxidation catalyst is regenerated during the fuel rich mode regeneration cycles.

Figure 33:
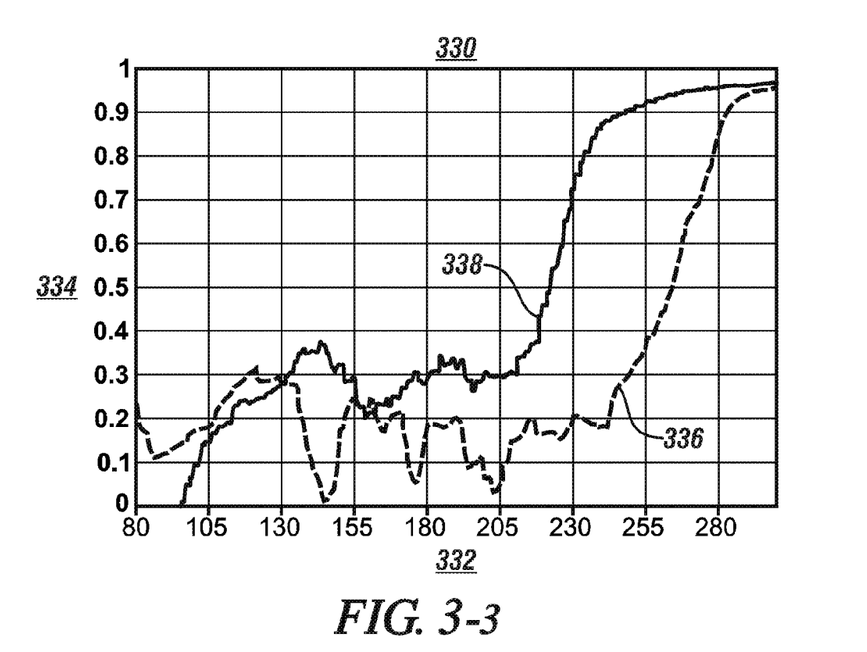

FIG. 3-3 depicts HC oxidation performance of a LNT based aftertreatment device based on exhaust gas inlet temperature. Plot 330 depicts inlet temperature (° C.) on horizontal axis 332 and conversion ratio along vertical axis 334. Plot line 336 depicts the conversion ratio 334 in relation to inlet temperature 332 for a LNT based aftertreatment device having no regeneration cycles in a fuel rich mode. Plot line 338 depicts the conversion ratio 334 in relation to inlet temperature 332 for a LNT based aftertreatment device having been exposed to regeneration cycles in a fuel rich mode. The LNT based aftertreatment device demonstrates improved performance after regenerating under fuel rich conditions. The LNT based aftertreatment device shows improved conversion of each of CO, HC and $C_3H_6$ following regeneration. In an exemplary embodiment the one regeneration may consist of operating the engine for 5-10 seconds under rich conditions. In an exemplary embodiment wherein the aftertreatment device includes an oxidation catalyst not having been treated with LNT materials a similar improvement may occur as the oxidation catalyst is regenerated during the fuel rich mode regeneration cycles.

Figure 4:
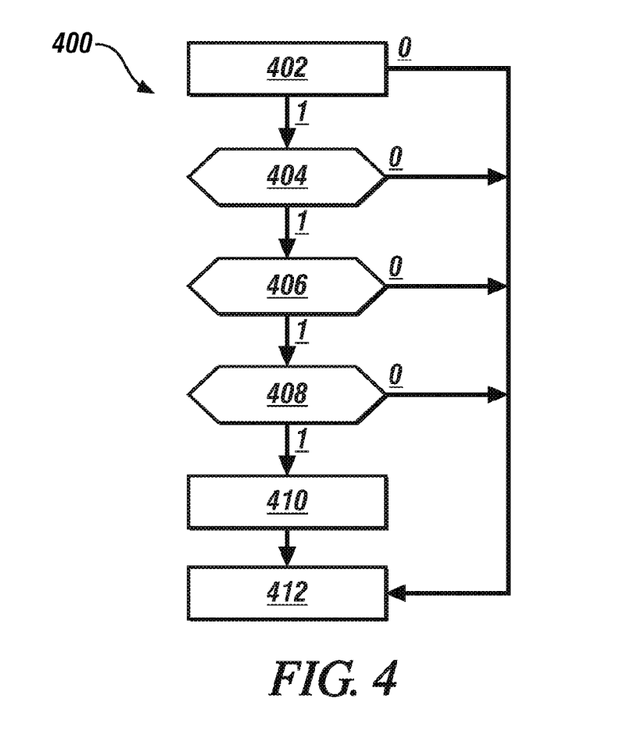
FIG. 4 illustrates an exemplary method of controlling the engine to improve exhaust gas aftertreatment device conversion during engine cold start events, in accordance with the disclosure.

FIG. 4 schematically depicts an exemplary method of controlling the engine to improve exhaust aftertreatment device conversion during engine cold start events. Table 1 is provided as a key wherein the numerically labeled blocks and the corresponding functions are set forth as follows.

TABLE 1

| BLOCK | BLOCK CONTENTS |
|---|---|
| 402 | Monitoring vehicle operating parameters |
| 404 | Determining whether the vehicle is stopped |
| 406 | Determining whether the engine is signaled to switch off |
| 408 | Determining whether the exhaust aftertreatment device is at |

TABLE 1-continued

| BLOCK | BLOCK CONTENTS |
|---|---|
| | a predetermined operating temperature |
| 410 | Controlling the engine in a run-on state for a predetermined period of time |
| 412 | Stopping the engine |

The method 400 includes monitoring vehicle operating parameters 402, for example engine temperature, exhaust flow temperature, wheel speed, and operator inputs such as gear selector and ignition switch. Based upon the monitored vehicle operating parameters the method includes determining whether the vehicle is stopped 404, determining whether the engine is commanded off 406 (e.g. ignition switch off), and determining whether the exhaust aftertreatment device 20, which may include an oxidation catalyst, a LNT or an oxidation catalyst treated with LNT materials in the washcoat is at a predetermined operating temperature 408, such as near a predetermined operating temperature of 300° C. in an exemplary embodiment. If all three of these conditions are met then the engine continues to run in a "run-on" state for a predetermined period of time 410, up to 10 seconds in an exemplary embodiment, before stopping the engine from rotating 412. During this "run-on" state the engine may be throttled and fueled in such a way as to continue flowing air and incompletely-combusted fuel into the exhaust aftertreatment device 20 sufficient to pre-treat the active materials, for example at a ratio of approximately 14 to 1. This will result in faster warmup and reduced emissions during subsequent engine cold starts. In a LNT based exhaust aftertreatment device, by running the engine in rich conditions for a period prior to engine shut-off the fuel constituents in the exhaust gas trigger the release of $NO_x$ from the storage material (and the regeneration of $NO_x$ storage sites), and promote the reduction of the released $NO_x$ to $N_2$ over the reduction catalyst material of the exhaust aftertreatment device 20. The LNT based exhaust aftertreatment device may comprise a LNT or an oxidation catalyst treated with LNT materials in the washcoat of the oxidation catalyst. Operation of the engine may be achieved using known methods. In one embodiment fuel may be injected into the exhaust gas system using an external injector to provide incompletely combusted fuel sufficient to pre-treat the LNT materials.

Figure 51:
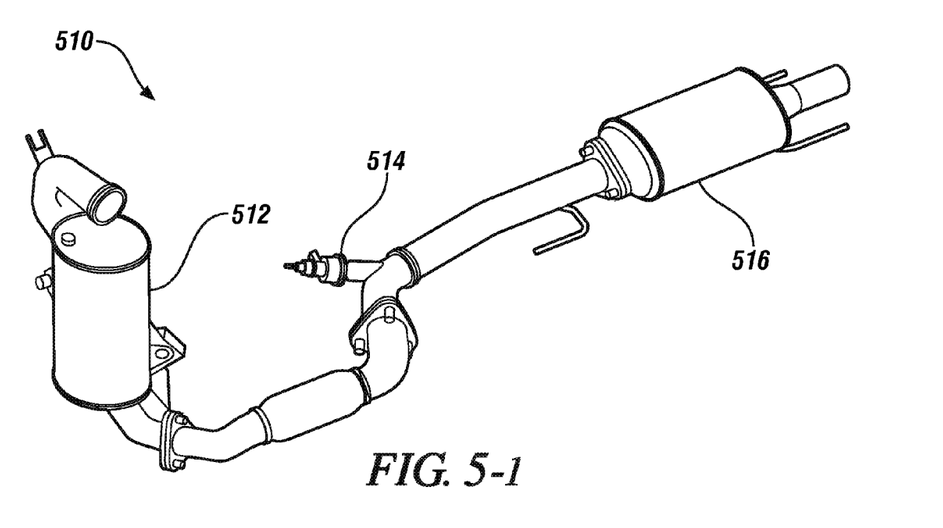

FIG. 5-1 schematically illustrates an alternate embodiment of an exhaust aftertreatment system 510 that has been constructed to purify exhaust gases that are output from a compression-ignition internal combustion engine. Exhaust aftertreatment system 510 includes a first exhaust aftertreatment device 512 includes an oxidation catalyst in combination with a particulate filter element that fluidly couples to the exhaust manifold of the engine to treat entrained raw exhaust gases output from the engine. The first exhaust aftertreatment device 512 may be additionally treated with materials found in Lean $NO_x$ Trap (LNT) systems. Adding LNT materials to the washcoat of an oxidation catalyst such as the first exhaust aftertreatment device 512 may allow for accelerated cold start lightoff and reduced emissions during cold start of the engine.

Exhaust aftertreatment system 510 may also include a second exhaust aftertreatment device 516 including an ammonia-selective catalytic reactor device (NH3-SCR device) that fluidly couples to a downstream outlet of the first exhaust aftertreatment device 512. A urea injector 514 may inject urea into the exhaust pipe upstream of the NH3-SCR device 516 via a nozzle inserted therein in response to a command from a controller, e.g., an engine controller.

Figure 52:
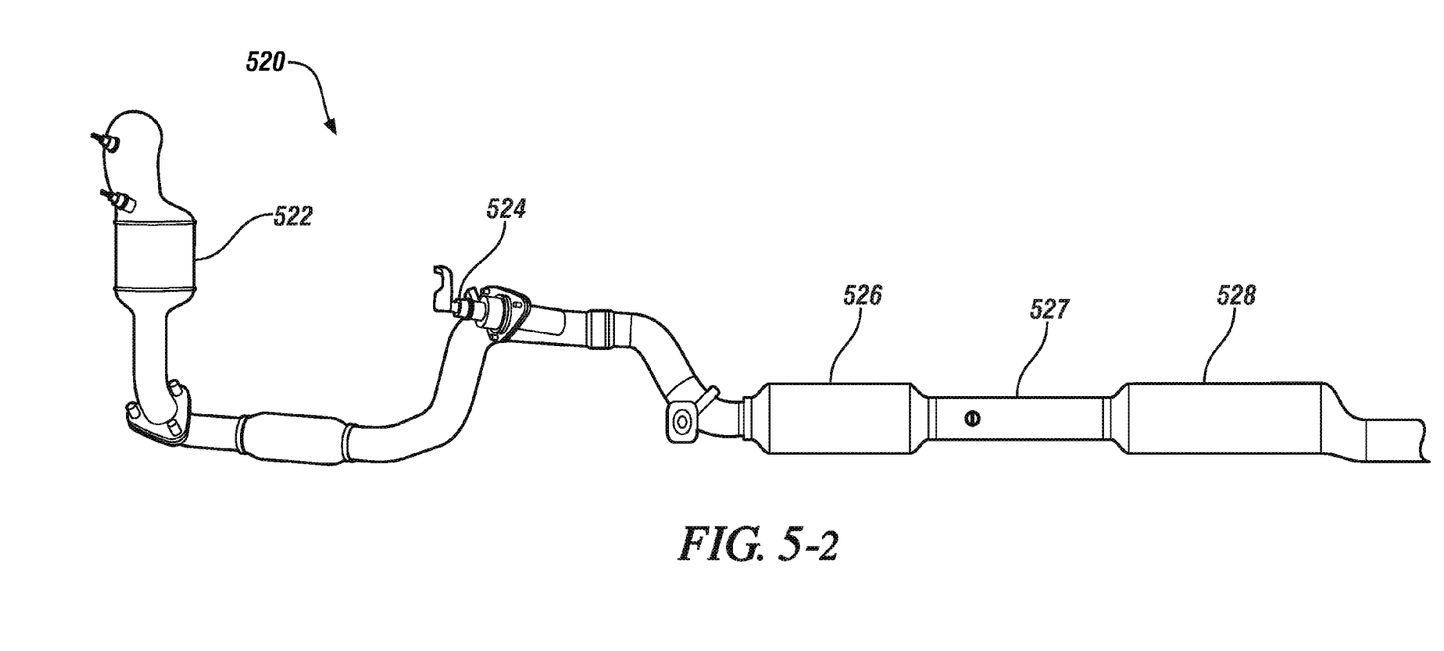

FIG. 5-2 schematically illustrates an alternate embodiment of an exhaust aftertreatment system 520 that has been constructed to purify exhaust gases that are output from a compression-ignition internal combustion engine. Exhaust aftertreatment system 520 includes a first exhaust aftertreatment device 522 includes an oxidation catalyst that fluidly couples to the exhaust manifold of the engine to treat entrained raw exhaust gases output from the engine. The first exhaust aftertreatment device 522 may be additionally treated with materials found in Lean $NO_x$ Trap (LNT) systems. Adding LNT materials to the washcoat of an oxidation catalyst such as the first exhaust aftertreatment device 522 may allow for accelerated cold start lightoff and reduced emissions during cold start of the engine.

Exhaust aftertreatment system 520 may also include a second exhaust aftertreatment device 526 including an ammonia-selective catalytic reactor device (NH3-SCR device) that fluidly couples to a downstream outlet of the first exhaust aftertreatment device 522. A urea injector 524 may inject urea into the exhaust pipe upstream of the NH3-SCR device 526 via a nozzle inserted therein in response to a command from a controller, e.g., an engine controller. A third exhaust aftertreatment device 528 may be coupled downstream of the second exhaust aftertreatment device 526 and may include an oxidation catalyst in combination with a particulate filter element to further treat exhaust gases output from the engine. An HC injector 527 may in integrated into the exhaust aftertreatment system 520 upstream of third exhaust aftertreatment device 528.

Figures 6, 53:
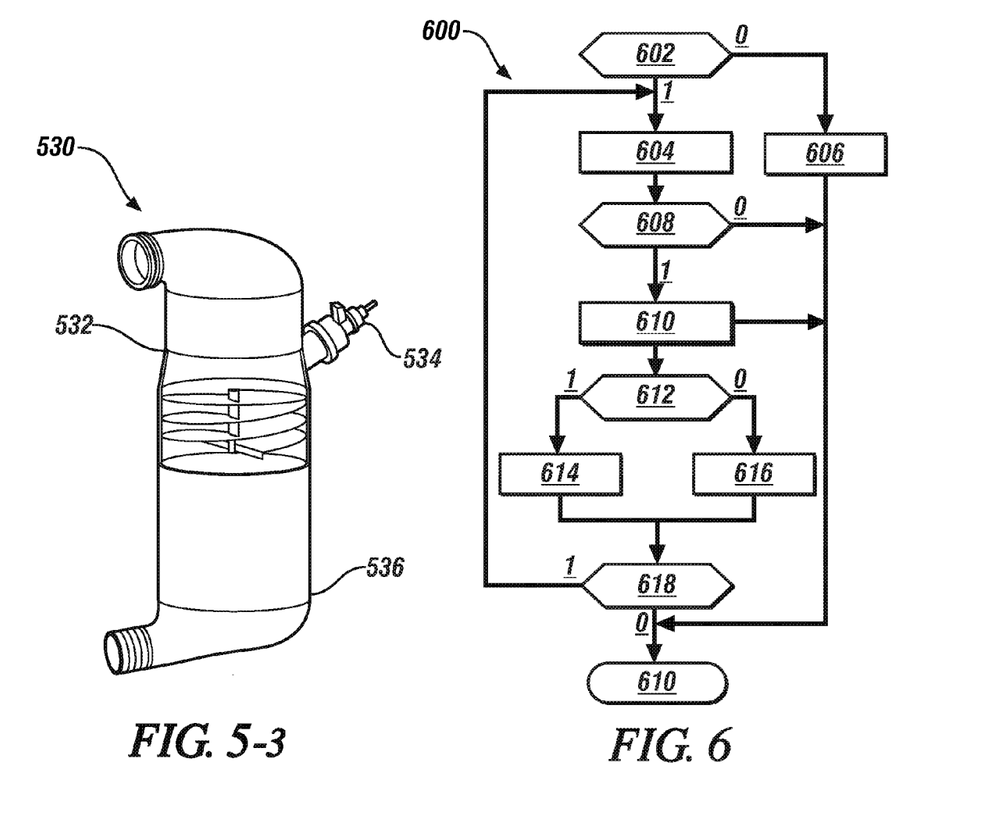

FIG. 5-3 schematically illustrates an alternate embodiment of an exhaust aftertreatment system 530 that has been constructed to purify exhaust gases that are output from a compression-ignition internal combustion engine. Exhaust aftertreatment system 530 includes a first exhaust aftertreatment device 532 includes an oxidation catalyst that fluidly couples to the exhaust manifold of the engine to treat entrained raw exhaust gases output from the engine. The first exhaust aftertreatment device 532 may be additionally treated with materials found in Lean $NO_x$ Trap (LNT) systems. Adding LNT materials to the washcoat of an oxidation catalyst such as the first exhaust aftertreatment device 532 may allow for accelerated cold start lightoff and reduced emissions during cold start of the engine.

Exhaust aftertreatment system 530 may also include a second exhaust aftertreatment device 536 including an ammonia-selective catalytic reactor device (NH3-SCR device) that fluidly couples to a downstream outlet of the first exhaust aftertreatment device 532. A urea injector 534 may inject urea into the exhaust pipe upstream of the NH3-SCR device 536 via a nozzle inserted therein in response to a command from a controller, e.g., an engine controller.

FIG. 6 schematically depicts an exemplary method of controlling the engine to improve exhaust aftertreatment device conversion during engine cold start events in an exhaust aftertreatment system including an electrically heated catalyst (EHC). Table 2 is provided as a key wherein the numerically labeled blocks and the corresponding functions are set forth as follows.

TABLE 2

| BLOCK | BLOCK CONTENTS |
|---|---|
| 602 | Is the engine off? |
| 604 | Turn on the EHC |
| 606 | Turn off the EHC |
| 608 | Does the EHC temperature exceed a predetermined threshold? |
| 610 | Inject fuel and air into exhaust gas flow |
| 612 | Does the air/fuel ratio exceed a predetermined threshold? |
| 614 | Increase the amount of fuel injected into the exhaust gas flow |
| 616 | Reduce the amount of fuel injected into the exhaust gas flow |
| 618 | Does the amount of $NO_x$ in the exhaust aftertreatment device exceed a predetermined threshold? |
| 620 | Exit |

When the engine is off as determined at 602 the electrically heated catalyst heating is controlled to an on state 604. When the engine is on at 602 the electrically heated catalyst heating is off state 606 and the control method is exited. When the EHC is controlled to an on state 604 it is determined whether the EHC temperature exceeds a predetermined threshold temperature 608. If the EHC temperature does exceed the threshold temperature fuel and air is injected into the exhaust 610 including any exhaust aftertreatment devices. If the EHC temperature does not exceed the threshold temperature the control method is exited. The air/fuel ratio is monitored 612 and if the air/fuel ratio exceeds a predetermined threshold the amount of fuel injected into the exhaust gas flow is increased 614. If the air/fuel ratio does not exceed the predetermined threshold the amount of fuel injected into the exhaust gas is reduced 616. The amount of $NO_x$ in the exhaust aftertreatment device is monitored and if the amount of NOx exceeds a predetermined threshold the process returns to step 604. If the amount of NOx does not exceed the predetermined threshold then the control method is exited.

An alternate embodiment of an exhaust aftertreatment system that has been constructed to purify exhaust gases that are output from a compression-ignition internal combustion engine may include a controlled bypass valve to enable the exhaust flow to reach the aftertreatment catalyst devices bypassing a turbocharger device downstream of the engine. The bypass valve may permit the exhaust gas flow to more rapidly reach the exhaust aftertreatment devices and more rapidly heat the oxidation catalyst and LNT materials in the exhaust aftertreatment device, thus permitting the exhaust aftertreatment devices to achieve operational temperatures more quickly during an engine cold-start event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a vehicle including an exhaust aftertreatment system for purifying exhaust gases from a compression-ignition engine, comprising:
monitoring vehicle operating parameters;
based upon the vehicle operating parameters:
determining whether the vehicle is stopped;
determining whether the engine is signaled to switch off;
determining whether an exhaust aftertreatment device is at a predetermined operating temperature; and
controlling the engine in a run-on state for a predetermined period of time when the vehicle is stopped, the engine is commanded off and the exhaust aftertreatment device is at the predetermined operating temperature, said run-on state including operating the engine in a throttled and fueled state.

2. The method of claim 1 wherein the run-on state effects regeneration of the exhaust aftertreatment device.

3. The method of claim 1 wherein said throttled and fueled state comprises a rich air to fuel ratio.

4. The method of claim 3 wherein said rich air to fuel ratio is substantially 14:1.

5. The method of claim 2 wherein the exhaust aftertreatment device includes an oxidation catalyst.

6. The method of claim 2 wherein the exhaust aftertreatment device includes a lean $NO_x$ trap.

7. The method of claim 6 wherein operating the engine in a throttled and fueled state to regenerate the exhaust aftertreatment device including a lean $NO_x$ trap comprises operating the engine in a fuel-rich mode.

8. The method of claim 5 wherein the exhaust aftertreatment device including an oxidation catalyst further includes a lean $NO_x$ trap.

9. The method of claim 8 wherein the lean $NO_x$ trap comprises a washcoat applied to the exhaust aftertreatment device.

10. The method of claim 9 wherein the lean $NO_x$ trap washcoat applied to the exhaust aftertreatment device comprises a $NO_x$ oxidation catalyst, a $NO_x$ reduction catalyst, and a $NO_x$ storage material.

11. The method of claim 1 further comprising electrically heating the exhaust aftertreatment device to achieve the predetermined operating temperature.

12. An exhaust aftertreatment system for purifying exhaust gases from a compression-ignition engine of a vehicle, comprising:
a first exhaust aftertreatment device;
a second exhaust aftertreatment device comprising an ammonia-selective catalytic reduction catalyst fluidly coupled to a downstream outlet of the first exhaust aftertreatment device; and
a control system including a control module configured to:
monitor vehicle operating parameters;
based upon the vehicle operating parameters:
determine whether the vehicle is stopped;
determine whether the engine is commanded off;
determine whether the first exhaust aftertreatment device is at a predetermined operating temperature; and
control the engine in a run-on state for a predetermined period of time when the vehicle is stopped, the engine is commanded off and the first exhaust aftertreatment device is at the predetermined operating temperature, said run-on state including operating the engine in a throttled and fueled state sufficient to regenerate the first exhaust aftertreatment device.

13. The exhaust aftertreatment system of claim 12 wherein operating the engine in the throttled and fueled state to regenerate the first exhaust aftertreatment device comprises flowing air and incompletely-combusted fuel into the first exhaust aftertreatment device.

14. The exhaust aftertreatment system of claim 13 wherein said throttled and fueled state comprises a rich air to fuel ratio.

15. The exhaust aftertreatment system of claim 12 wherein the first exhaust aftertreatment device includes an oxidation catalyst.

16. The exhaust aftertreatment system of claim 12 wherein the first exhaust aftertreatment device includes a lean $NO_x$ trap.

17. The exhaust aftertreatment system of claim 15 wherein the first exhaust aftertreatment device including an oxidation catalyst further includes a lean $NO_x$ trap.

18. The exhaust aftertreatment system of claim 17 wherein the lean $NO_x$ trap comprises a washcoat applied to the exhaust aftertreatment device, the lean $NO_x$ trap washcoat comprising a $NO_x$ oxidation catalyst, a $NO_x$ reduction catalyst, and a $NO_x$ storage material.

19. The exhaust aftertreatment system of claim 12 further comprising controlling the temperature of the first exhaust aftertreatment device to achieve said predetermined operating temperature using an electrically heated catalyst.

20. An exhaust aftertreatment system for purifying exhaust gases from a compression-ignition engine of a vehicle, comprising:
  an exhaust aftertreatment device including an electrically heated catalyst;
  a control module configured to:
    monitor vehicle operating parameters;
    determine whether the vehicle is stopped;
    determine whether the engine is commanded off;
    control the electrically heated catalyst to a heating on mode when the engine is commanded off;
    determine whether the electrically heated catalyst of the exhaust aftertreatment device is at a predetermined operating temperature; and
    control the engine in a run-on state for a predetermined period of time when the vehicle is stopped, the engine is commanded off and the electrically heated catalyst of the exhaust aftertreatment device is at said predetermined operating temperature;
  said run-on state comprising:
    injecting fuel and air into the exhaust gases;
    controlling the air/fuel ratio of the exhaust gases to achieve a predetermined air/fuel ratio;
    monitoring a $NO_x$ level in the exhaust aftertreatment device; and
    continuing operation of the engine in the run-on state until the $NO_x$ level in the exhaust aftertreatment device falls below a predetermined threshold.

* * * * *